United States Patent
Fang

(10) Patent No.: US 7,337,178 B2
(45) Date of Patent: Feb. 26, 2008

(54) SYSTEM AND METHOD FOR POSTING RECORDS IN CUSTOMS

(75) Inventor: Xuemin Fang, Shenzhen (CN)

(73) Assignees: Hong Fu Jin Precision Ind. (Shenzhen) Co., Ltd., Shenzhen (CN); Hon Hai Precision Industry Co., Ltd., Tu-Cheng (TW)

( * ) Notice: Subject to any disclaimer, the term of this patent is extended or adjusted under 35 U.S.C. 154(b) by 515 days.

(21) Appl. No.: 10/823,246

(22) Filed: Apr. 12, 2004

(65) Prior Publication Data

US 2004/0204956 A1    Oct. 14, 2004

(30) Foreign Application Priority Data

Apr. 11, 2003    (TW) .............................. 92108304 A

(51) Int. Cl.
*G06F 7/00*    (2006.01)

(52) U.S. Cl. ...................................... 707/100; 707/101

(58) Field of Classification Search .............. 707/1–10, 707/100, 101
See application file for complete search history.

(56) References Cited

U.S. PATENT DOCUMENTS

| 2003/0115072 | A1 | 6/2003 | Rajiv Manucha | |
|---|---|---|---|---|
| 2004/0039629 | A1* | 2/2004 | Hoffman et al. | 705/10 |
| 2004/0128301 | A1* | 7/2004 | Thint et al. | 707/101 |
| 2004/0205659 | A1* | 10/2004 | Barry et al. | 715/530 |
| 2004/0243343 | A1* | 12/2004 | Nelson et al. | 702/182 |

FOREIGN PATENT DOCUMENTS

CN    00109867.5    1/2002

* cited by examiner

*Primary Examiner*—Wilson Lee
(74) *Attorney, Agent, or Firm*—Wei Te Chung

(57) ABSTRACT

A system for posting records in customs includes a number of client computers (10), an enterprise server (12), a customs server (16) and a database (14). The client computers provide interfaces for users to input information and obtain information. The enterprise server receives and handles input information, generates records for posting in customs, and transmits the records to the customs server. The enterprise server includes a system configuring module (21), an information maintaining module (22), a records posting module (23), an information enquiring module (24), and a customs data synchronizing module (25). The database stores configured information on an enterprise, contracts, materials and customs, generated records, and customs feedback. A related method is also disclosed.

12 Claims, 3 Drawing Sheets

SYSTEM AND METHOD FOR POSTING RECORDS IN CUSTOMS

BACKGROUND OF THE INVENTION

1. Field of the Invention

The present invention relates to a computer-based system and method for posting records in customs, and particularly to a system and method for automatically posting enterprise, contract and materials records in customs through one or more customs communication networks.

2. Background of the Invention

Posting records in customs is necessary for many enterprises, particularly for international traders and manufacturers. Conventional business management systems and methods used in relation to customs have certain shortcomings, such as unduly high proneness to human error and unduly time-consuming steps. A conventional method for managing imports and exports is disclosed in P.R. China Patent No. CN1,332,426A, issued on Jan. 23, 2002 and entitled Method and System for Managing Imports and Exports Commodity Inspection Number Authentication. This patent discloses a network management system and method regarding an authentication number as a recognizable character. The system comprises: computers of a national and regional Inspection and Quarantine Bureau, computers for consulting and monitoring of number authentication consultation companies, a telephone network connecting with the monitoring computers via modems, a computer network connecting with the telephone network via network terminals, and computers of national and regional customs. The method facilitates inspection of quantities and directions of flow of commodities by customs, provides users with liberal access to desired data, and efficiently avoids or reduces the loss of national tax revenue. However, the system and method does not efficiently deal with the problem of automatically posting records in customs.

SUMMARY OF THE INVENTION

An objective of the present invention is to provide a system and method for automatically generating electronic records for posting in customs, the records comprising information on an enterprise, contracts and materials.

Another objective of the present invention is to provide a system and method for automatically transmitting the generated electronic records to a customs server, and for receiving feedback on the records from the customs server.

To achieve the above-mentioned objectives, a preferred embodiment of a system for posting records in customs of the present invention comprises a plurality of client computers, an enterprise server, a database and a customs server. The client computers provide interfaces for users to maintain information on enterprise, contracts, materials, and customs; the enterprise server receives and handles input information, generates records for posting in customs, and transmits the records to the customs server. The customs server comprises a system configuring module for initializing the system; an information maintaining module for adding, modifying, inquiring and deleting information on enterprise, contracts, materials, and customs; a records posting module for generating records for posting in customs according to the information on enterprise, contracts and materials, for transmitting the records to the customs server, and for storing the records in database; an information enquiring module for enquiring of the statuses of the records; and a customs data synchronizing module for synchronizing the customs information stored in the database based on the content of feedback from the customs server, and updating the corresponding records accordingly. The database stores configured information on the enterprise, contracts, materials and customs, generated records, and customs feedback. The customs server receives the records transmitted by the enterprise server, and transmits the feedback on the records to the enterprise server. The client computers are connected with the enterprise server via an electronic communication network. The enterprise server is connected with the database via a database connectivity, and is connected with the customs server via an electronic communication network.

Further, a preferred method of the present invention for posting records in customs comprises the following steps: (a) providing a system for monitoring and maintaining information on enterprise, contracts, materials, and customs; (b) enquiring of status of the information on enterprise, contracts, and materials, and determining whether the records for posting in customs have been generated; (c) generating corresponding records which have not been generated; (d) transmitting the records to the customs server, storing the records in the database, and updating the statuses of the records; and (e) receiving and storing feedback on the records from the customs server, determining whether the records needs to be modified as a result of the feedback, and modifying the records accordingly and synchronizing customs information, if modification is needed. The feedback on the records from the customs server comprises notices of error in the content and/or format of a record, and notices of acceptance of a record.

Other objects, advantages and novel features of the present invention will be drawn from the following detailed description of the present invention with the attached drawings, in which:

DETAILED DESCRIPTION OF THE INVENTION

Figure 1:
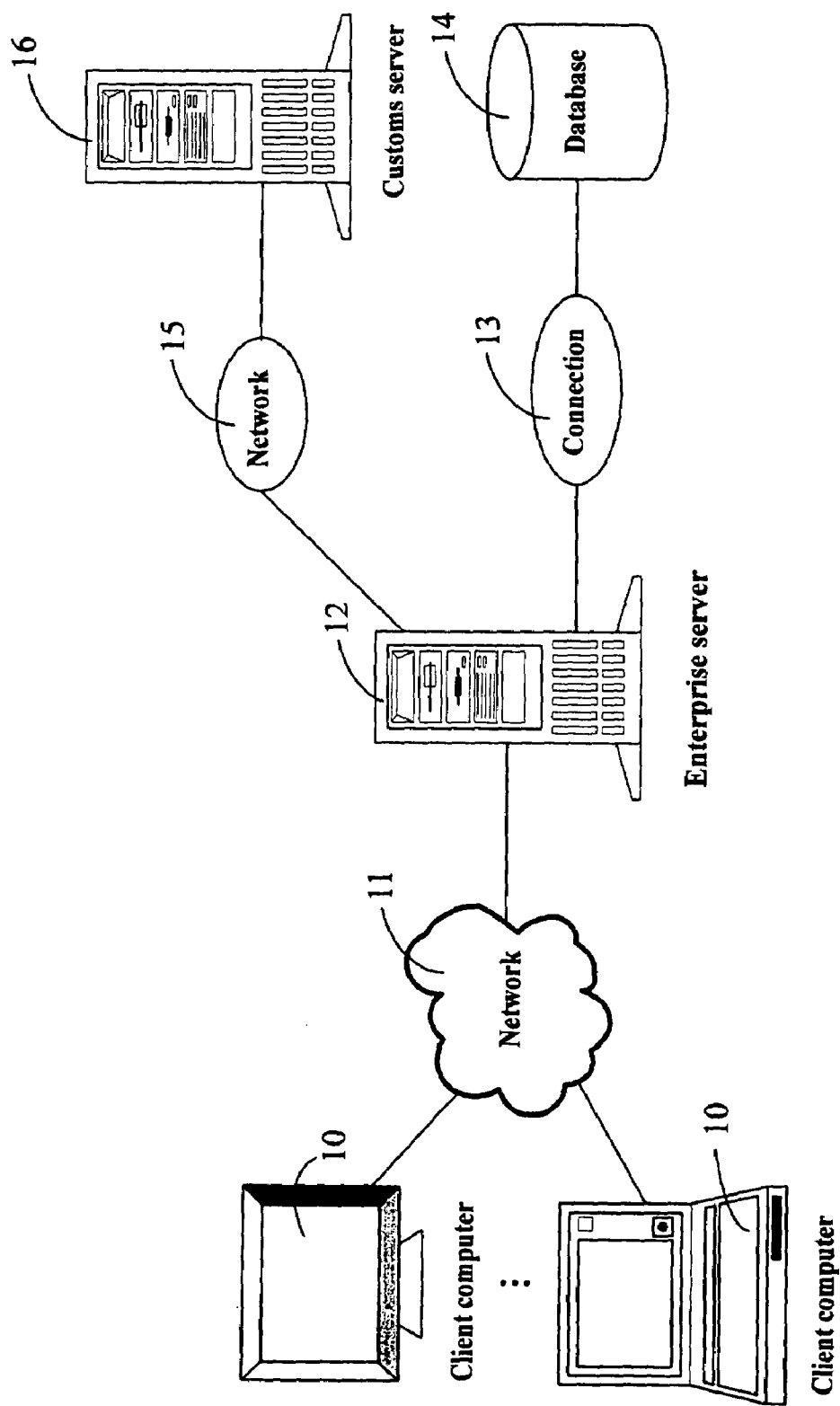
FIG. 1 is a schematic diagram of hardware configuration of a system for posting records in customs in accordance with the preferred embodiment of the present invention.

FIG. 1 is a schematic diagram of hardware configuration of a system for posting records in customs in accordance with the preferred embodiment of the present invention. A plurality of client computers 10 is connected with an enterprise server 12 via a network 11. The enterprise server 12 is connected with a database 14 via a connection 13, and is connected with a customs server 16 via a network 15. The networks 11, 15 can jointly or severally be the Internet, an intranet, or another suitable means of electronic communication. The connection 13 is a kind of database connection, which can be an Open Database Connectivity (ODBC), a Java Database Connectivity (JDBC), or another suitable kind of connectivity. The client computers 10 provide interfaces for users to initialize the system and maintain information. The enterprise server 12 stores function modules for receiving and handling input information, and for generating records for posting in customs and transmitting the records to the customs server 16. The records for posting in customs are hereinafter referred to simply as "records." The enterprise server 12 also receives feedback from the customs server 16. The database 14 stores configured information on an enterprise, information on contracts, information on materials, generated records, customs information, customs feedback, and so on. The customs server 16 receives the records transmitted by the enterprise server 12, and transmits feedback on the records to the enterprise server 12. Feedback comprises notices of error in the content and format of a record, and notices of acceptance of a record.

Figure 2:
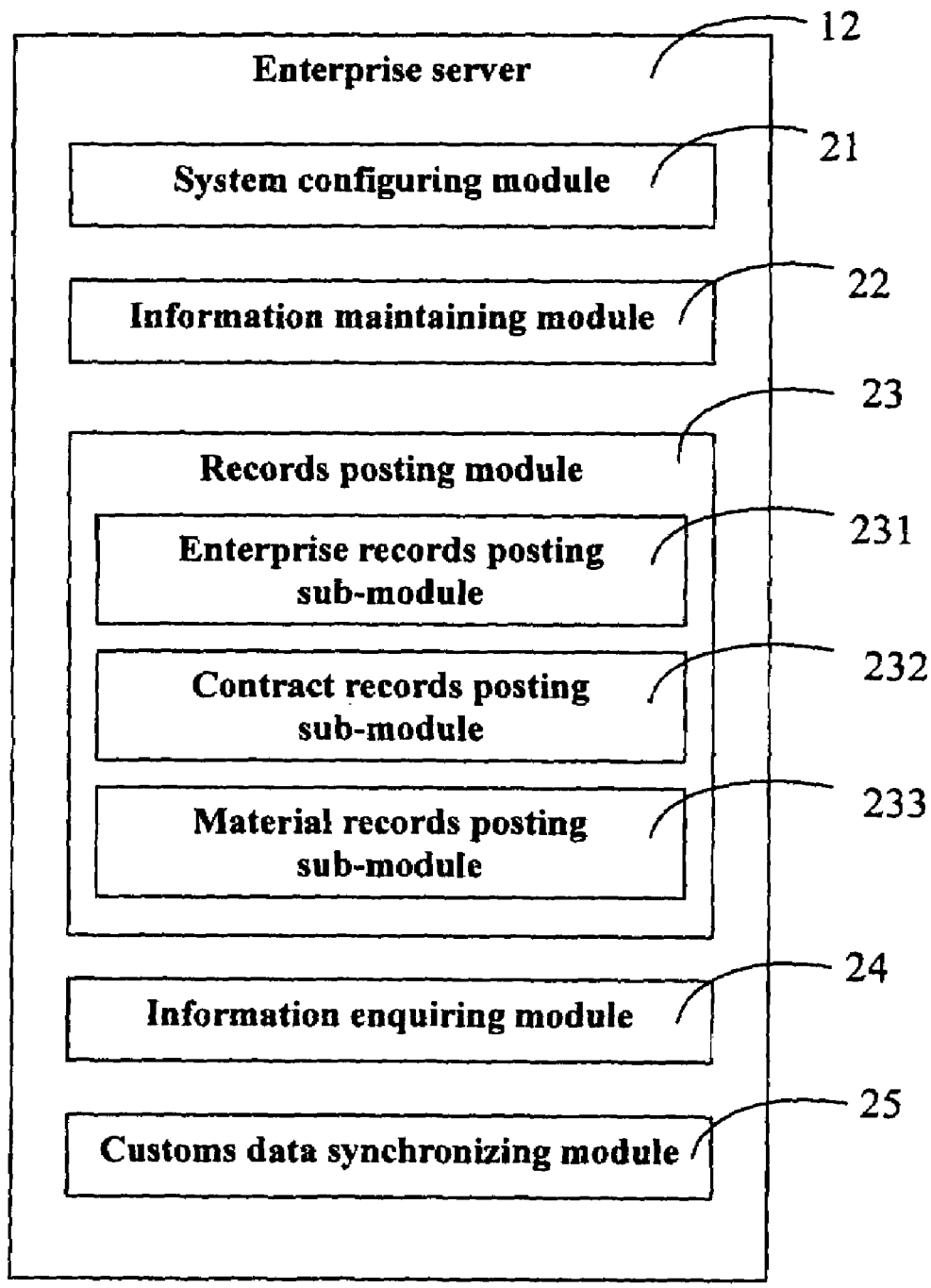
FIG. 2 is a schematic diagram of function modules of an enterprise server of the system of FIG. 1.

FIG. 2 is a schematic diagram of function modules of the enterprise server 12. The enterprise server 12 comprises a system configuring module 21, an information maintaining module 22, a records posting module 23, an information enquiring module 24, and a customs data synchronizing module 25.

The system configuring module 21 is used for adding and modifying the relevant FTP (File Transfer Protocol), communication, and dial-up information.

The information maintaining module 22 is used for adding, modifying, inquiring and deleting information on the enterprise, contracts, materials, and customs. The information on the enterprise comprises the enterprise's name, address, and other information found in a business license of the enterprise. The information on the contracts comprises: number of each contract, names of both parties of each contract, time limit, and place and method of performance of each contract. The information on the materials comprises each material's name, stock quantity, unit price, and so on. The materials include finished products and raw materials. The information on customs comprises name and code of the customs office, name and code of each delivery port and departure port, and so on.

The records posting module 23 is used for generating records according to the information on the enterprise, contracts and materials, for transmitting the records to the customs server 16, and for storing the records in the database 14. The records posting module 23 comprises an enterprise records posting sub-module 231, a contract records posting sub-module 232, and a material records posting sub-module 233. The enterprise records posting sub-module 231 is used for generating enterprise records according to the information on the enterprise. The contract records posting sub-module 232 is used for generating contract records according to the information on each contract. The material records posting sub-module 233 is used for generating material records according to the information on each material.

The information enquiring module 24 is used for enquiring of the statuses of the records. The statuses of the records comprise unrecorded records (i.e. not recorded at customs), recorded records (i.e. recorded at customs), and records that have been fed back by the customs server 16.

The customs data synchronizing module 25 is used for synchronizing the customs information stored in the database 14 based on the content of feedback from the customs server 16, and updating the corresponding records accordingly.

Figure 3:
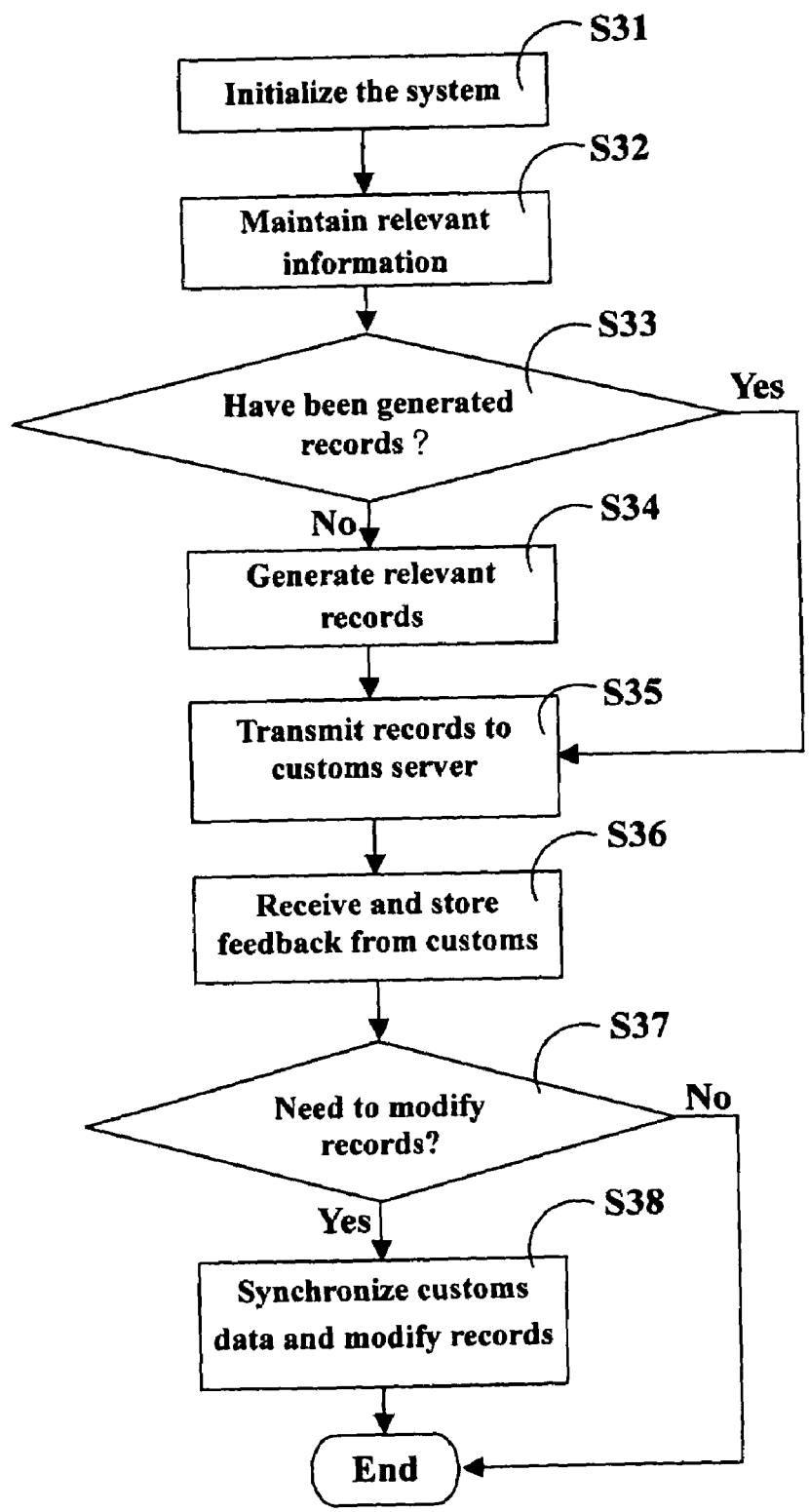
FIG. 3 is a flowchart of a preferred method for posting records in customs in accordance with the present invention.

FIG. 3 is a flowchart of a preferred method for posting records in customs. In step S31, a user initializes the above-described system for posting records in customs via the system configuring module 21. The initialization comprises adding and modifying an FTP setup, communications setup, dial-up setup, and so on. In step S32, after initializing, the user adds, modifies, inquires and deletes information on the enterprise, contracts, materials, and customs via the information maintaining module 22. In step S33, after maintaining, a user enquires of the status of the information on the enterprise, contracts and materials, and determines whether corresponding records have been generated. The records comprise the enterprise records, the contracts records, and the materials records. If the records have been generated, the procedure goes to step S35 described below. In step S34, if the records have not been generated, the records posting module 23 generates corresponding records which have not been posted in customs. In step S35, the records posting module 23 transmits the records to the customs server 16, stores the records in the database 14, and updates the statuses of the records. In step S36, the enterprise server 12 receives feedback on the records from the customs server 16, and stores the feedback in the database 14. In step S37, the enterprise server 12 determines whether the records need to be modified as a result of the feedback. If modification is not needed, the procedure is ended. If modification is needed, in step S38, the customs data synchronizing module 25 synchronizes the customs information stored in the database 14 based on the content of the feedback, and modifies the records accordingly. Thereupon, the procedure is ended.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A system for posting records in customs, the system comprising a plurality of client computers, an enterprise server, a database and a customs server, wherein:

the client computers provide interfaces for users to maintain information on an enterprise, contracts, materials and customs;

the enterprise server receives and handles input information, generates a plurality of records for posting in customs, and transmits the records to the customs server, the enterprise server comprising:

an information maintaining module for adding, modifying, inquiring and deleting the information on the enterprise, the contracts, the materials and customs;

a records posting module for generating the records for posting in customs according to the information on the enterprise, the contracts and the materials, for transmitting the records to the customs server, and for storing the records in a database, the records posting module comprising:

an enterprise records posting sub-module for generating enterprise records according to the information on the enterprise;

a contract records posting sub-module for generating contract records according to information on respective contracts; and a material records posting sub-module for generating material records according to information on respective materials; and a customs data synchronizing module for synchronizing customs information stored in the database based on the content of feedback on the records received from the customs server, and for updating the records accordingly;

the database stores configured information on the enterprise, the contracts, the materials and customs, the records, and the customs server feedback on the records; and the customs server receives the records transmitted by the enterprise server, and transmits the feedback on the records to the enterprise server.

2. The system as described in claim 1, wherein the enterprise server further comprises a system configuring module for initializing the system.

3. The system as described in claim 1, wherein the enterprise server further comprises an information enquiring module for enquiring of statuses of the records.

4. The system as described in claim 3, wherein the statuses of the records comprise unrecorded records, recorded records, and the records which have been fed back by the customs server.

5. A computer-enabled method for posting records in customs, the method comprising the following steps:
   providing a plurality of client computers for monitoring and maintaining information on an enterprise, contracts, materials and customs;
   providing an information maintaining module in an enterprise server for enquiring of a status of information on the enterprise, contracts and materials, and determining whether corresponding records for posting in customs have been generated;
   providing an enterprise records posting module in the enterprise server for generating enterprise records according to the information on the enterprise, the enterprise records forming part of the corresponding records;
   providing a contract records posting module in the enterprise server for generating contract record according to information on respective contracts, the contract records forming part of the corresponding records;
   providing a material records posting module in the enterprise server for generating material records according to information on respective materials, the material records forming part of the corresponding records;
   the enterprise server transmitting the corresponding records to a customs server, and storing the corresponding records in a database; and
   the enterprise server receiving and storing feedback on the corresponding records from the customs server, determining whether the corresponding records need to be modified according to the feedback, and synchronizing customs information in the database according to the feedback and modifying the corresponding records accordingly if modification is needed.

6. The method as described in claim 5, further comprising the step of updating the status of the information on the enterprise, the contracts and the materials.

7. The method as described in claim 5, wherein the feedback on the corresponding records from the customs server comprises one or more notices of error in the content and/or format of a record, and/or one or more notices of acceptance of a record.

8. A system for posting records in customs, the system comprising a plurality of client computers, an enterprise server, a database, and a customs server, wherein:
   the client computers provide interfaces for users to maintain information on an enterprise, contracts, materials and customs;
   the enterprise server receives and handles input information, generates a plurality of records for posting in customs, and transmits corresponding records to the customs server, the enterprise server comprising:
   a records posting module, comprising;
      an enterprise records posting sub-module for generating enterprise records according to information on the enterprise;
      a contract records posting sub-module for generating contract records according to information on respective contracts; and
      a material records posting sub-module for generating material records according to information on respective materials;
   the database stores configured information on the enterprise, contracts, materials and customs, the corresponding records, and customs feedback in response to the corresponding records; and
   the customs server receives the corresponding records transmitted by the enterprise server, and transmits the feedback in response to the corresponding records to the enterprise server.

9. The system as described in claim 8, wherein the enterprise server further comprises a system configuring module for initializing the system.

10. The system as described in claim 8, wherein the enterprise server further comprises an information enquiring module for enquiring of status of the corresponding records.

11. The system as described in claim 8, wherein the enterprise server further comprises an information maintaining module for adding, modifying, inquiring and deleting the information on the enterprise, the contracts, the materials and customs.

12. The system as described in claim 8, wherein the enterprise server further comprises a customs data synchronizing module for synchronizing customs information stored in the database based on the content of the feedback from the customs server, and for updating the corresponding records accordingly.

* * * * *